United States Patent [19]

DeLue et al.

[11] 4,210,631

[45] Jul. 1, 1980

[54] PREPARATION OF BORON TRICHLORIDE

[75] Inventors: Norman R. DeLue, Corpus Christi, Tex.; John C. Crano, Akron, Ohio

[73] Assignee: PPG Industries, Inc., Pittsburgh, Pa.

[21] Appl. No.: 23,858

[22] Filed: Mar. 26, 1979

[51] Int. Cl.² ............................................. C01B 35/06
[52] U.S. Cl. ..................................................... 423/292
[58] Field of Search ......................................... 423/292

[56] References Cited

U.S. PATENT DOCUMENTS 2,943,916  7/1960  McElroy .............................. 423/292

OTHER PUBLICATIONS

Gerrard, Wm., *The Organic Chemistry of Boron*; Academic Press, N.Y., 1961: pp. 13–15.

*Primary Examiner*—G. O. Peters
*Attorney, Agent, or Firm*—Irwin M. Stein

[57] ABSTRACT

Boron trichloride is prepared in substantially stoichiometric quantities by free-radical chlorination of borate ester, e.g., trimethyl borate, at temperatures of between about 20° C. and 100° C., more preferably between about 40° C. and about 90° C. The mole ratio of chlorine to borate ester is from about 5.5:1 to about 7.5:1. Reactor pressures are moderate, e.g., generally less than 3 atmospheres absolute. Atmospheric pressure can be used. An inert liquid organic solvent, e.g., carbon tetrachloride, can be used as the reaction medium. Gaseous reaction products are removed from the reactor during the chlorination reaction. In addition to boron trichloride, carbon monoxide (rather than phosgene) and hydrogen chloride are the principal products of the chlorination reaction. Phosgene is produced in substantially lower amounts than when chlorination is conducted at autogeneous pressures and the chlorine:trimethyl borate mole ratio is 9:1 or more. The boron trichloride product is separated from the carbon monoxide, hydrogen chloride and phosgene products, and recovered.

20 Claims, 1 Drawing Figure

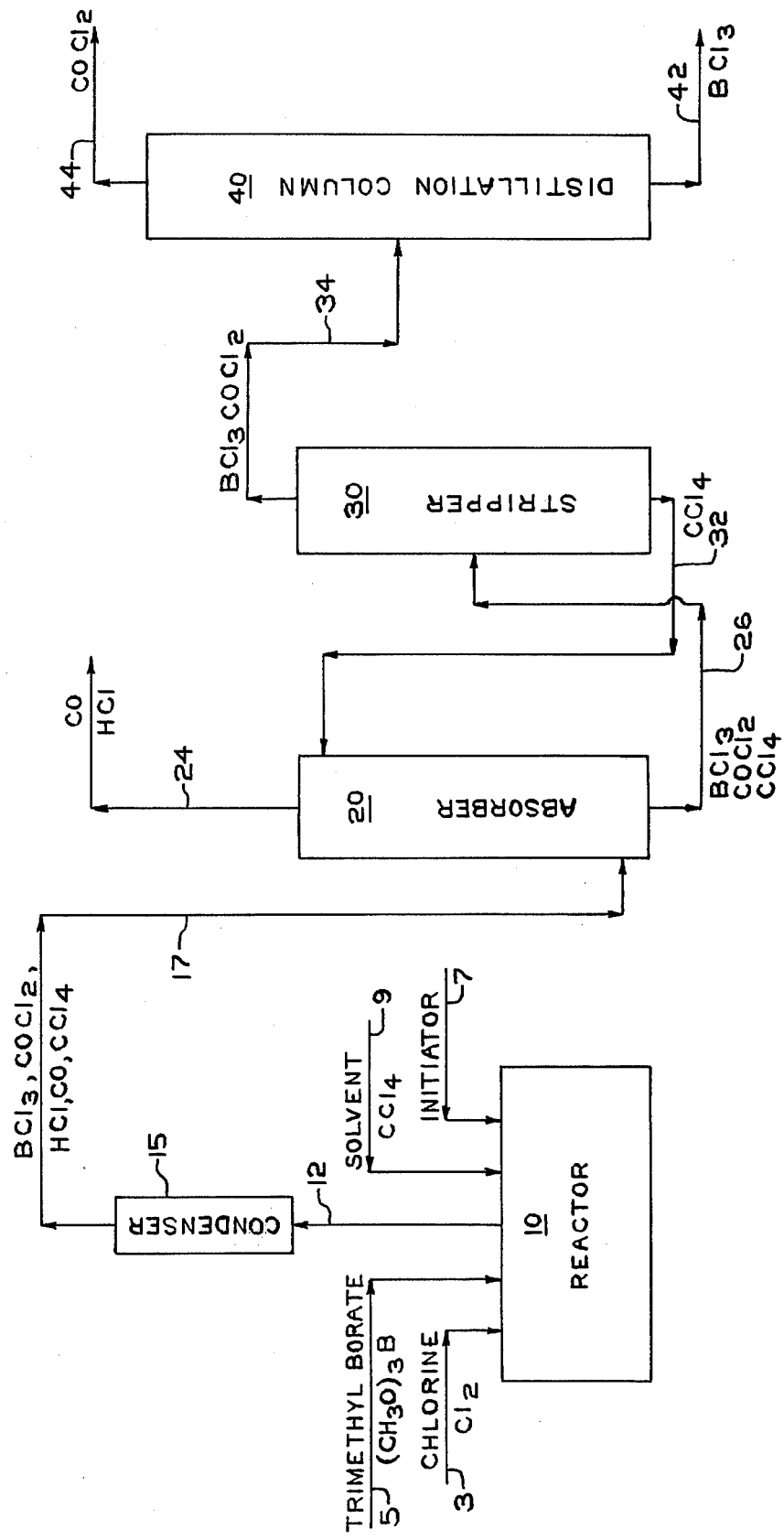

PREPARATION OF BORON TRICHLORIDE

DESCRIPTION OF THE INVENTION

Boron trichloride is a compound that has many reported industrial uses. For example, its utility as an intermediate for the production of other boron containing compounds, such as diborane and refractory metal borides, e.g., titanium diboride, is established. It is also used as a refrigerant, as a catalyst and in Grignard reactions.

A number of methods have been described in the literature for preparing boron trichloride. One such method involves passing chlorine gas through a reactor containing a mixture of boric oxide and carbon at temperatures of the order of 700-1000° C. Various difficulties, however, have been recognized in this process. Firstly, a substantial portion of the chlorine reactant is wasted in the formation of phosgene, which is difficult to separate from boron trichloride. Secondly, a solid complex of boron trichloride and boric oxide ($B_2O_3$) is formed in the effluent lines of the reactor and in subsequent solid traps. Further, special operating conditions and materials of construction are required when using chlorine at temperatures of 700° C. and above. The processing difficulties and corrosion problems of such a process contribute appreciably to a high cost of production.

The preparation of boron trichloride by chlorination of trimethyl borate or trimethoxyboroxine at room temperature and autogenous pressures has been described in U.S. Pat. No. 2,943,916. The balanced equation for the reaction of trimethyl borate with chlorine is reported in column 1, line 39 of that patent as follows:

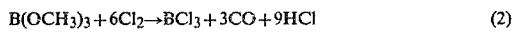

$$B(OCH_3)_3 + 9Cl_2 \rightarrow BCl_3 + 3COCl_2 + 9HCl \qquad (1)$$

In accordance with equation (1), three moles of phosgene are produced for each mole of boron trichloride product. The formation of three times the amount of phosgene as boron trichloride is wasteful of the chlorine reactant. Moreover and equally of importance is the difficulty in separating phosgene from boron trichloride.

Among the methods suggested in the literature for separating phosgene from boron trichloride are (a) thermally cracking the phosgene at high temperatures, e.g., about 1000° C., (b) contacting the boron trichloride phosgene stream with a carbon catalyst at between 300° C. and 700° C., and (c) fractional distillation. Separation of boron trichloride from phosgene by fractional distillation is difficult and expensive because of the close boiling points of these two materials, i.e., phosgene boils at about 8° C. and boron trichloride boils at about 12.5° C. Thus, a need exists for a low temperature process for preparing boron trichloride which reduces substantially the amount of phosgene formed.

It has now been discovered that the amount of phosgene coproduct produced in the chlorination of borate ester, e.g. trimethyl borate, can be substantially reduced by conducting the chlorination at from about 20° C. to about 100° C., in the presence of a free radial initiator while maintaining the mole ratio of chlorine to borate ester reactant introduced into the reactor at between about 5.5:1 and about 7.5:1 and concurrently removing gaseous products of the chlorination reaction from the reactor. The reaction can be conducted optionally in the presence of an inert organic liquid solvent. Absolute reactor pressures can vary; but, generally are less than three atmospheres. It has been discovered further that the yield of boron trichloride is substantially stoichiometric, i.e, the yield is not reduced when less than 9 moles of chlorine per mole of trimethyl borate is used.

BRIEF DESCRIPTION OF THE DRAWING

The present invention will be understood more readily by reference to the accompanying drawing which is a diagrammatic illustration of an embodiment of the present invention in which the reaction is conducted in the presence of an inert liquid organic solvent and a free-radical initiator.

DETAILED DESCRIPTION

In accordance with the present invention, chlorine is reacted with borate ester reactant in a mode ratio of substantially less than 9:1. It has been found surprisingly that the principal carbon-containing product formed in the process of the present invention is carbon monoxide rather than phosgene. The reaction can be represented by the following balanced equation:

$$B(OCH_3)_3 + 6Cl_2 \rightarrow BCl_3 + 3CO + 9HCl \qquad (2)$$

Comparing equation (2) with equation (1), it can be seen readily that in the second equation 3 moles of carbon monoxide are formed instead of the 3 moles of phosgene recited in equation (1)—with a consequent reduction in the amount of chlorine reactant utilized. Further, equation (2) is less exothermic than equation (1), thereby making the chlorination reaction represented by equation (2) easier to control.

The mole ratio of chlorine to borate ester reactant, e.g., trimethyl borate, introduced into the reactor is less than the stoichiometric amount of 9:1 prescribed in U.S. Pat. No. 2,943,916. Although equation (2) provides for a mole ratio of 6:1, the mole ratio of chlorine to borate ester can vary slightly from theoretical value of 6:1. Typically, the mole ratio will be maintained over the period of the reaction at between about 5.5:1 and 7.5:1, preferably between about 5.75:1 and about 6.75:1. When the borate ester reactant use is a chloromethyl ester of boric acid, the chlorine content of the ester is taken into account in calculating the mole ratio, i.e., in determining the total amount of chlorine that is introduced into the reactor.

The temperature at which the chlorination reaction is conducted can vary, e.g. between about 20° C. and about 100° C. Typically, the reaction will be conducted between about 40° C. and about 90° C. Preferably reaction temperatures will range between about 60° C. and about 80° C., e.g., between about 65° C. and about 75° C. It has been found surprisingly that temperatures above room temperature, e.g., 40° C. and above, improve the selectivity of the reaction toward the production of carbon monoxide. Thus, at said more favorable temperatures, the amount of phosgene formed is substantially less than the amount formed at room temperature, e.g., 23° C. At temperatures less than 20° C., significant amounts of phosgene are produced.

The temperature at which the chlorination reaction is conducted will also depend on the particular solvent used, if any, for the reaction medium and the reactor pressure. At atmospheric pressure, the maximum reaction temperature will be determined by the boiling point of the solvent or the temperature at which the reaction mixture boils when no solvent is used. Temperatures above the boiling point of the solvent or, for example, in the upper portion of the aforesaid described temperature range, e.g., 70°-100° C. can be used when the chlorination reaction is conducted at pressures slightly above atmospheric. At superatmospheric pressures, temperatures in excess of 100° C., e.g., 125° C., can be used. Similarly, if reaction pressures less than atmospheric are used, the reaction temperature will be lowered accordingly.

The pressure at which the chlorination reaction is conducted is commonly less than about 3 atmospheres absolute pressures. Such moderate pressures differ significantly from the pressures attained in the chlorination process described in U.S. Pat. No. 2,943,916 wherein the reaction according to equation (1) is conducted in a sealed tube, i.e., at autogenous pressures. It is estimated that the reactor pressure developed in the reaction described in the aforesaid patent is greater than 10 and probably is in the neighborhood of 15 to 20 atmospheres.

The chlorination reaction of the present invention is more usually conducted at between about 0 and about 20 pounds per square inch gage, more typically between about 0 and 15 pounds per square inch gage (psig). The chlorination reaction is conducted conveniently at atmospheric or ambient pressures; however, when conducted continuously, pressures above atmospheric are used to overcome the pressure drop in equipment and piping downstream of the reactor. As indicated, reduced pressures, i.e., less than atmospheric, can also be used, e.g., pressures as low as 200 millimeters of mercury are contemplated.

The chlorination reaction can be conducted, if desired, in a reaction medium comprising an inert liquid organic solvent. Use of a solvent assists in controlling the reaction temperature. The use of an inert liquid organic solvent as the reaction medium for the aforesaid chlorination reaction is the subject of co-assigned U.S. patent application Ser. No. 80,736, filed Oct. 1, 1979. Thus, a portion of the solvent can be withdrawn as vapor from the reactor, forwarded to a reflux condenser where it is condensed and then returned to the reactor. The solvent should be chemically inert to the reactants and reaction products and preferably will be one in which the reaction products are soluble. Most preferably, the reactants and reaction product will be soluble in the solvent. As the solvent, there can be mentioned carbon tetrachloride and chloro-fluorinated oils such as Halocarbon oil, Fluorolube heat exchange fluids (polymers of trifluorovinyl chloride), and polychlorinated aromatics such as 1,2,4-trichlorobenzene. Also contemplated are the analogous liquid polyhalogenated, e.g., chlorinated, fluorinated and/or brominated, aliphatic hydrocarbons of from one to four atoms and aromatic hydrocarbons. Carbon tetrachloride is particularly useful as the solvent for the reason that it is chemically inert to and is a solvent for the reactants and reaction products.

The particular solvent or the amount of solvent used is not critical. Only that amount needed to solubilize the reactants and reaction products and act as heat sink for the heat of reaction is required. Generally the weight ratio of solvent to borate ester will vary from about 1:1 to 10:1. When the chlorination reaction is conducted in the absence of an extraneous solvent, the borate ester and the intermediate compounds formed during the reaction serve as the reaction medium.

In the practice of the herein described process, the amount of phosgene coproduct produced is substantially reduced from that formed in accordance with equation (1), i.e., the amount of phosgene formed is less than 0.6 moles per mole of borate ester, e.g., trimethyl borate, reactant. In contrast, the amount of phosgene formed in accordance with the prior art, e.g., equation (1), is about 3 moles of phosgene per mole of trimethyl borate reactant. The amount of phosgene formed in accordance with the present invention can be reduced to less than 0.2, e.g., 0.1, mole of phosgene per mole of trimethyl borate and, at most preferred conditions, the amount of phosgene formed can be reduced to less than 0.03 mole, e.g., 0.01 mole, of phosgene per mole of trimethyl borate reactant.

Various benefits accrue by reducing the amount of phosgene formed in the reaction. Firstly, the amount of chlorine wasted in the formation of such coproduct is reduced accordingly. Unless such phosgene is recovered and treated, e.g., by cracking, to recover its chlorine content, the phosgene is destroyed, e.g., by neutralization with caustic. Both alternatives result in an economic burden on the process. The latter treatment results in a net loss of chlorine. Secondly, and perhaps more importantly, the less the amount of phosgene formed in the reaction, the less phosgene that needs to be separated from the boron trichloride product.

As the boron compound reactant, there can be used the borate esters, namely, trimethyl borate, trimethoxyboroxine and chloromethyl esters of boric acid. Examples of chloromethyl esters include dimethoxy boron chloride, i.e., $(CH_3O)_2BCl$, methoxy boron dichloride, i.e., $(CH_3O)BCl_2$, and chloromethyl estters represented by the following general formulae: $B(OCH_2Cl)(OCH_3)_2$, $B(OCH_2Cl)_2(OCH_3)$, $B(OCH_2Cl)_3$, $B(OCHCl_2)(OCH_3)_2$, $B(OCHCl_2)_2(OCH_3)$, $B(OCHCl_2)_3$, $(ClCH_2O)_2BCl$, $(Cl_2CHO)_2BCl$, $(ClCH_2O)BCl_2$, and $(Cl_2CHO)BCl_2$.

The term trimethoxyboroxine is intended to mean the product obtained from the reaction of boric oxide and trimethyl borate in varying ratios. These products can be represented for convenience by the formula $B_2O_3 \cdot (OCH_3)_3$. It is to be understood, however, that an excess of either boric oxide or trimethyl borate may be present, in which case the aforesaid formula may not represent the exact composition of the material.

Trimethyl borate is a commercially available material. It can be prepared by the reaction of boric oxide or boric anhydride with methanol. See, for example, Schlesinger et al, J. Am. Chem. Soc. 75, 213–215 (1953). See also U.S. Pat. Nos. 2,217,354, 2,088,935, 2,808,424, and 2,813,115 all of which relate to the aforesaid process for manufacturing methyl borate.

The boron compound, e.g., trimethyl borate, and chlorine reactants should be substantially dry for the reason that boron trichloride is readily hydrolyzed by water. Therefore, in order prevent any unnecessary loss of boron trichloride product, the reactants, solvent, reactor and recovery equipment should be substantially anhydrous, i.e., less than 10 ppm (parts per million) water.

The above described chlorination reaction is free radical initiated and, therefore, any free radical initiator that generates free radicals at the temperature of chlorination, e.g., light or organic peroxy compounds, can be used. The amount of initiator used is not critical so long as a threshold level of free radicals are provided to initiate and maintain the chlorination reaction. Such amount is typically referred to as an initiating amount.

Any source of light which will provide the necessary useful radiation, can be used. Such radiation is generally considered to be available from near ultraviolet or barely visible light. Thus, a common household tungsten filament light bulb, sun lamp, or mercury arc lamp can be used. The quantum of radiation required is difficult to define; however, one skilled in the art can readily ascertain whether quantum of useful radiation is adequate for the quantity of reactants used by observing whether the chlorination reaction occurs. The light source for the photochlorination can be internal (inside the reactor) or external (outside the reactor). In the latter case, means must be provided for the radiation to enter the reactor, e.g., by use of a glass reactor or a glass sight port.

In addition to photoinitiation, the chlorination reaction can be initiated by an organic free radical initiator, i.e., an organic azo or peroxy compound. Examples of such compounds include diacyl peroxides, monoperoxycarbonates, dialkyl peroxydicarbonates, peroxyesters, and azo compounds. The particular free-radical initiator used is not critical provided that it is compatible with the reactants and solvent (if used), i.e. nonreactive chemically, and generates free-radicals efficiently at the chlorination temperature selected. A person skilled in the art can readily select an appropriate initiator from published half-life data, which is a means of expressing the rate of decomposition of the initiator at a particular temperature. The organic free-radical initiators should be substantially free of water, i.e., substantially anhydrous, and substantially free of materials such as solvents, oils, etc. that can be chlorinated. Typically the number of carbon atoms in each radical (alkyl, aryl or cycloalkyl) of the peroxide will vary from 2 to 12.

Examples of suitable organic free radical initiators include: diacyl peroxides such as acetyl peroxide, benzoyl peroxide, caprylyl peroxide, p-chlorobenzoyl peroxide, decanoyl peroxide, 2,4-dichlorobenzoyl peroxide, lauroyl peroxide and propionyl peroxide; peroxyesters such as t-butyl peroxyacetate, t-butyl peroxy (2-ethylhexanoate), t-butyl peroxyisobutyrate, and t-butyl peroxypivalate; dialkyl peroxydicarbonates such as diethyl, diisopropyl, di-n-propyl, di-n-propyl, di-sec-butyl, diisobutyl, di-t-butyl, dicapryl, di-2-ethylhexyl, dibenzyl, dicyclohexyl and di-4-t-butyl cyclohexyl peroxydicarbonate; monoperoxycarbonates such as t-butylperoxy isopropyl carbonate, and azo compounds such as azo-bis-isobutyronitrile.

As in the case of light, only that amount of organic free-radical initiator that is required to initiate and maintain the chlorination reaction need be used, i.e., an initiating amount. That amount will vary depending on the free-radical initiator used, the temperature of chlorination and the quantity of reactants. Such an amount can be determined readily by one skilled in the art. It is contemplated that for a peroxydicarbonate, such as diisopropyl peroxydicarbonate, about one weight percent, basis the borate ester, e.g., trimethyl borate, will be used. The organic free-radical initiator will be introduced into the reactor continuously for a continuous chlorination, as distinguished from a batch chlorination, so as to maintain a continuous supply of free radicals in the reaction medium.

Referring now to the attached figure, which is a diagrammatic illustration of an illustration of an embodiment of the present invention, there is shown reactor 10 for conducting the chlorination reaction. Reactants trimethyl borate and chlorine are introduced into the reactor by means of feed lines 5 and 3 respectively. The chlorine reactant is preferably introduced below the level of the liquid in the reactor, e.g., by means of a sparger, to provide agitation of and contact between the reactants. When introduced in this manner, the chlorine is absorbed readily in the reaction medium which, as shown in carbon tetrachloride. Carbon tetrachloride solvent and initiator are introduced into reactor 10 through feed lines 9 and 7 respectively. The organic free radical initiator can be replaced by a source of ultraviolet light, e.g., an ultraviolet light, placed within the reactor.

Typically, borate ester and solvent (if used) are introduced into the reactor to form the reaction medium. Thereafter, the reaction medium is exposed to the free-radical initiator (light or organic peroxy or azo compound) and chlorine introduced below the surface of the reaction medium. In a continuous reaction, the required reactants are also metered into the reactor. After an initial induction period, e.g., less than about five minutes, the chlorination reaction proceeds rapidly with substantial consumption of the chlorine reactant added. The products of the reaction, i.e., hydrogen chloride, carbon monoxide, phosgene and boron trichloride, are removed continuously from the reactor along with solvent, e.g., carbon tetrachloride, as a gaseous effluent by means of flow line 12. This gaseous product effluent is forwarded to reflux condenser 15 wherein the solvent and partially chlorinated borate ester intermediates are condensed. The condensate is returned to the reactor to control the reactor temperature and return the aforesaid borate ester intermediate for further chlorination. The gaseous effluent is forwarded by flow line 17 to absorber 20 where it is contacted with further carbon tetrachloride solvent introduced thereto by means of flow line 32. Boron trichloride and phosgene are absorbed in the carbon tetrachloride solvent introduced into absorber 20 and removed through flow line 26 to stripper 30. Carbon monoxide and hydrogen chloride not absorbed in the carbon tetrachloride solvent in absorber 20 are removed therefrom through flow line 24. These gases can be separated and recovered for use in other chemical reactions or destroyed, e.g., by burning (CO) or neutralization with a base (HCl).

In stripper 30, boron trichloride and phosgene are separated from the carbon tetrachloride solvent and these products forwarded through flow line 34 to distillation column 40 where the phosgene is removed as overhead through flow line 44 and boron trichloride product removed as bottoms through flow line 42. Depending on the ultimate use, distillation column 40 may not be required. Thus, if the end use of boron trichloride can tolerate the level of phosgene found therein, such as less than 1.5 weight percent, e.g., 0.5 weight percent, the phosgene can be left in the boron trichloride. The phosgene can be recovered and used as reactant in other chemical reactions, e.g., phosgenation, or destroyed by reaction with a base, e.g, sodium hydroxide.

It will be readily apparent to those skilled in the art that the product separations indicated in the figure, i.e., in absorber 20 and stripper 30, are not complete and that small amounts of reaction products and solvent will be found in those streams where they are not otherwise indicated. For example, the overhead from absorber 20 will contain, in addition to carbon monoxide and hydrogen chloride, small amounts of boron trichloride, phosgene and carbon tetrachloride. Similarly, the bottoms from stripper 30 will contain small amounts of boron trichloride and phosgene in addition to carbon tetrachloride solvent.

The present invention is more particularly described in the following Examples which are intended as illustrative only since numerous modifications and variations therein will be apparent to those skilled in the art.

EXAMPLE I

A three hundred milliliter, four-necked baffled glass flask was equipped with a thermometer, magnetic stirrer, water-cooled condenser and glas tube for the introduction of chlorine below the surface of the reaction mixture. The reactor was irradiated with a 275 watt sunlamp. The reaction flask was cooled by means of a water bath. Gases leaving the reaction flask passed through a water-cooled condenser and into a 500 milliliter, two-necked flask which acted as an absorber. This flask contained carbon tetrachloride and was immersed in wet ice. The gases entering the absorber entered through a glass tube under the surface of the carbon tetrachloride. The absorber was also fitted with a dry ice condenser through which passed the gases not absorbed in the chilled carbon tetrachloride. Such nonabsorbed gases then passed through a caustic scrubber, wet test meter and finally through a gas sampling bulb.

After flushing the above described system thoroughly with nitrogen, the reaction flask was charged with 100 milliliters of carbon tetrachloride and the absorber charged with 250 milliliters of carbon tetrachloride. Both amounts of the carbon tetrachloride had been dried with molecular sieves. After further nitrogen flushing, the reaction vessel was heated to approximately 50° C. with the water bath and sunlamp. Trimethyl borate (0.088 mole, 9.15 grams) was added to the reaction flask and after nitrogen flushing of the system, the nitrogen flow was discontinued and chlorine introduced into the reaction flask at a rate of 0.27 grams per minute.

The temperature of the reaction mixture rose to about 60° C. upon introduction of the chlorine reactant. Chlorine flow at the rate of between 0.25 and 0.30 grams per minute was continued for 130 minutes during which time the reaction temperature was maintained at between 60° and 62° C. At that time, the normally colorless reaction mixture became yellow indicating the presence of unreacted chlorine. The chlorine flow was discontinued and the flow of nitrogen restarted. The reaction mixture was then heated slowly to reflux to drive all of the products out of the reaction vessel.

On cooling, an infrared spectrum of the reaction mixture showed it to contain only carbon tetrachloride. The material taken from the absorber was shown to be a solution of phosgene and boron trichloride. The amount of phosgene collected amounted to 2.0 grams (0.020 mole) and was determined with an infrared calibration curve using the carbonyl absorption at 1828 cm$^{-1}$. The phosgene represented a yield of 7.5 mole percent based on trimethyl borate and assuming stoichiometry according to equation (1). The amount of boron trichloride in the absorber was determined to be 9.1 grams (0.078 mole). An infrared spectrum of the gas passing through the wet test meter during addition of chlorine to the reaction flask showed the gas to be carbon monoxide with a small amount of carbon tetrachloride. The amount of carbon monoxide evolved during the chlorination was estimated with the wet test meter to be about 0.25 mole.

EXAMPLE II

The photochlorination described in Example I was repeated except that the reaction mixture was maintained at 23°–25° C. throughout the chlorination by periodic addition of ice to the water bath surrounding the reaction vessel. The amount of boron trichloride, phosgene and carbon monoxide obtained were determined to be as follows:

Boron trichloride—9.2 grams (0.078 mole)
Phosgene—5.0 grams (0.050 mole)
Carbon monoxide—0.22 mole The aforesaid amount of phosgene represented about a 19 mole percent yield based on trimethyl borate and assuming stoichiometry according to equation (1).

Examples I and II show that boron trichloride is produced in accordance with equation (2). No reduction in the yield of boron trichloride from that described using a chlorine:trimethyl borate mole ratio of 9:1 was observed. The data shows also that the principal carbon containing product of the reaction is carbon monoxide and the amount of phosgene coproduct is significantly reduced from that obtained when the chlorine:trimethyl borate ratio is 9:1 and the reaction conducted at autogeneous pressures and without simultaneous removal of the gaseous products of the reaction. The data shows further that the amount of phosgene produced in accordance with the reaction represented by equation (2) is substantially reduced at 60° C. than when the reaction is conducted at 23° C. (room temperature).

EXAMPLE III

A 500 milliliter, five-necked flask was used as reaction vessel and was equipped with a thermometer, magnetic stirrer and water-cooled condenser. A glass tube was inserted into the flask for the introduction of chlorine below the surface of the reaction mixture. A fluorocarbon resin tube was inserted into the reaction flask for the addition of trimethyl borate using a syringe pump. The reaction vessel was cooled by means of a water bath as in Example I. A glass well was positioned in the center neck of the reaction flask and a six watt incandescent light bulb placed in the glass well to serve as the radiation source for the photochlorination reaction.

Gases leaving the reactor were passed through a water-cooled condenser and into a 500 milliliter threenecked flask containing carbon tetrachloride. The aforesaid flask, which acted as an absorber, was equipped with a bottom stop cock for the removal of samples and a plastic line for the addition of carbon tetrachloride from a reservoir. The gases from the reaction flask were introduced into the absorber below the surface of the carbon tetrachloride through a glass frit. Refrigerated coolant at about −5° to −4° C. was circulated through a condenser on the absorber and through a bath surrounding the absorber. Gases not trapped in the absorber passed through a caustic scrubber, wet test meter and finally through a gas sampling bulb.

After flushing the system thoroughly with nitrogen, the absorber was charged with 250 milliliters of predried carbon tetrachloride. The water bath surrounding the reactor was heated at 60° C. and 200 milliliters of predried carbon tetrachloride added to the reaction flask. Trimethyl borate was introduced into the reactor at a rate of 0.060 grams per minute (0.035 mole/hour). After the addition of approximately one gram of trimethyl borate, a flow of 0.26 grams per minute (0.22 molehour) of chlorine was started and the flow of nitrogen discontinued. The system was operated for about five hours during which time the absorber was periodically emptied and the solution analyzed for boron trichloride and phosgene. The amount of carbon monoxide (identified through an infrared spectrum of the gaseous effluent) was determined with the wet test meter. After the first two hours of operation, the average rate of formation of each of the major products was observed to be:

Boron trichloride—3.8 grams/hour (0.032 mole/hour)
Phosgene—0.20 gram/hour (0.002 mole/hour)
Carbon monoxide—0.10 mole/hour It is believed that the actual rate of formation of boron trichloride and phosgene in the above described Example could have been slightly higher than those found because of incomplete absorption of these products in the carbon tetrachloride at the conditions of operation.

The data of Example III show that boron trichloride is produced in almost stoichiometric amounts basis the trimethyl borate reactant and that phosgene is formed only in about 1.9 mole percent basis the trimethyl borate and assuming stoichiometry according to equation (1).

Example IV

A 1000 milliliter, stirred glass autoclave was used was a reaction vessel and was equipped with a thermocouple and stainless steel tubes for the introduction of chlorine and trimethyl borate below the surface of the reaction mixture. The reaction vessel had a water jacket through which water was 64° C. was circulated. The reaction mixture was irradiated with a 275 watt sunlamp.

Gases leaving the reactor passed through a water cooled condenser and through a solenoid valve controlled by a pressure transducer. The pressure within the reactor was maintained at 7-8 psig throughout the run. Following the solenoid valve, the effluent gases passed into the bottom of a packed tower (absorber) filled with carbon tetrachloride. The tower was cooled by circulating a refrigerated, glycol-water solution (−3° C.) through a jacket surrounding the tower. Carbon tetrachloride was continuously introduced into the top of the tower at a rate identical to that at which the carbon tetrachloride solution was removed from the bottom. The solution leaving the absorber was analyzed periodically by infrared spectroscopy for boron trichloride and phosgene. The gases not absorbed in carbon tetrachloride passed through a chilled condenser, caustic scrubber, wet test meter, and gas sampling bulb.

After flushing the system thoroughly with nitrogen, the reaction vessel was charged with 400 milliliters of carbon tetrachloride and 2.5 grams (0.024 mole) of trimethyl borate. Thereafter, chlorine was added to the reaction vessel at a rate of 0.77-0.89 mole/hour and trimethyl borate at a rate of 0.134 mole/hour was started and maintained for 6 hours. During this time, the temperature of the reaction mixture was held at 67°-68° C. by holding the jacket temperature at 64° C.

After two hours of operation, the average rate of formation of each of the major products was observed to be:

boron trichloride—0.13 mole/hr.
phosgene—0.017 mole/hr.
carbon monoxide—0.38 mole/hr.

The data of Example IV show that with a reactor pressure of 7-8 psig, reactor temperature of about 67°-68° C. and a chlorine:trimethyl borate mole ratio of between about 5.7:1 and 6.6:1, only about 0.13 mole of phosgene per mole of trimethyl borate is produced.

Although the present process has been described with reference to specific details of certain embodiments thereof, it is not intended that such details should be regarded as limitations upon the scope of the invention except as and to the extent that they are included in the accompanying claims.

What is claimed is:

1. In the process of producing boron trichloride by chlorination of borate ester wherein phosgene is produced as a coproduct, the improvement which comprises reducing the amount of phosgene formed by contacting the borate ester with chlorine in a reactor in the presence of a free-radical initiator at temperatures of from about 20° C. to about 100° C. and simultaneously removing gaseous products of the chlorination reaction from the reactor, the mole ratio of chlorine to borate ester introduced into the reactor being about 5.5:1 and about 7.5:1.

2. The process of claim 1 wherein the borate ester is trimethyl borate, trimethoxyboroxine, chloromethyl esters of boric acid, and mixtures of such borate esters.

3. The process of claims 1 or 2 wherein the reaction is conducted at moderate reactor pressures.

4. The process of claim 3 wherein the reactor pressure is from about 0 to about 20 pounds per square inch gage.

5. The process of claim 1 or 2 wherein the reaction is conducted in an inert liquid organic solvent.

6. The process of claim 5 wherein the organic solvent is carbon tetrachloride.

7. The process of claims 1 or 2 wherein the reaction temperature is from about 40° C. to about 90° C.

8. The process of claims 1 or 2 wherein the reaction temperature is from about 60° C. to about 80° C.

9. The process of claims 1 or 2 wherein the mole ratio of chlorine to borate ester is between about 5.75:1 and about 6.75:1.

10. The process of claims 1 or 2 wherein the free-radical initiator is light, an organic peroxy compound or azo-bis-isobutyronitrile.

11. The process of claim 10 wherein the organic peroxy compound is a dialkylperoxydicarbonate, diacyl peroxide or peroxyester.

12. The process of claim 4 wherein the reaction is conducted in an inert liquid organic solvent.

13. The process of claim 12 wherein the solvent is carbon tetrachloride.

14. The process of claim 12 wherein the free-radical initiator is light, an organic peroxy compound or axo-bis-isobutyronitrile.

15. In the process of producing boron trichloride by chlorination of borate ester wherein phosgene is produced as a coproduct, the improvement which comprises reducing the amount of phosgene formed by contacting borate ester selected from the ground consisting of trimethyl borate, trimethoxyboroxine, chloromethyl esters o boric acid and mixtures of such borate esters with chlorine in the presence of a free-radical initiator in a reactor containing an inert liquid organic solvent at temperatures of from about 40° C. to about 90° C. and at reactor pressures of from about 0 to about 15 pounds per square inch gage and concurrently removing gaseous products of the chlorination reaction from the reactor, the mole ratio of chlorine to borate ester introduced into the reactor being between about 5.5:1 and about 7.5:1.

16. The process of claim 15 wherein the temperature is between about 60° C. and about 80° C. and the mole ratio of chlorine to borate ester is between about 5.75:1 and about 6.75:1.

17. The process of claims 15 or 16 wherein the inert organic solvent is carbon tetrachloride.

18. The process of claim 17 wherein the free-radical initiator is light, an organic peroxy compound or azo-bis-isobutyronitrile.

19. The process of claim 15 wherein the borate ester is trimethyl borate, the free radical initiator is light and the inert liquid organic solvent is carbon tetrachloride.

20. The process of claim 19 wherein the temperature is between about 60° C. and about 80° C. and the mole ratio is between about 5.75:1 and about 6.75:1.

* * * * *

UNITED STATES PATENT AND TRADEMARK OFFICE
CERTIFICATE OF CORRECTION

PATENT NO. : 4,210,631
DATED : July 1, 1980
INVENTOR(S) : Norman R. DeLue and John C. Crano It is certified that error appears in the above-identified patent and that said Letters Patent are hereby corrected as shown below:

Column 10, line 20, after "being" insert -- between --.

Column 10, line 59, "ground" should be --group--.

Column 10, line 61, "o" should be --of--.

Signed and Sealed this

Sixteenth Day of September 1980

[SEAL]

*Attest:*

SIDNEY A. DIAMOND

*Attesting Officer*     *Commissioner of Patents and Trademarks*